(12) United States Patent
Kotake et al.

(10) Patent No.: US 9,878,304 B2
(45) Date of Patent: Jan. 30, 2018

(54) METHOD OF MANUFACTURING WATER-ABSORBENT RESIN COMPOSITION

(71) Applicant: Sumitomo Seika Chemicals Co., Ltd., Kako-Gun, Hyogo (JP)

(72) Inventors: Masato Kotake, Hyogo (JP); Hironobu Masumoto, Hyogo (JP); Masahiro Kuzukawa, Hyogo (JP)

(73) Assignee: SUMITOMO SEIKA CHEMICALS CO., LTD., Kako-Gun, Hyogo (JP)

( * ) Notice: Subject to any disclaimer, the term of this patent is extended or adjusted under 35 U.S.C. 154(b) by 190 days.

(21) Appl. No.: 14/780,293

(22) PCT Filed: Jan. 30, 2014

(86) PCT No.: PCT/JP2014/052155
§ 371 (c)(1),
(2) Date: Sep. 25, 2015

(87) PCT Pub. No.: WO2014/156289
PCT Pub. Date: Oct. 2, 2014

(65) Prior Publication Data
US 2016/0051966 A1 Feb. 25, 2016

(30) Foreign Application Priority Data
Mar. 27, 2013 (JP) .................. 2013-067028

(51) Int. Cl.
*B01J 20/26* (2006.01)
*B01J 20/30* (2006.01)
*C08L 33/06* (2006.01)

(52) U.S. Cl.
CPC ............ *B01J 20/261* (2013.01); *B01J 20/30* (2013.01); *B01J 20/3042* (2013.01); *C08L 33/06* (2013.01); *B01J 2220/46* (2013.01)

(58) Field of Classification Search
None
See application file for complete search history.

(56) References Cited

U.S. PATENT DOCUMENTS

| 3,661,815 A | 5/1972 | Smith |
| 4,076,663 A | 2/1978 | Masuda et al. |
| (Continued) | | |

FOREIGN PATENT DOCUMENTS

| CN | 1611529 A | 5/2005 |
| CN | 102898662 A | 1/2013 |
| (Continued) | | |

OTHER PUBLICATIONS

Third Party Observation dated Mar. 10, 2017 issued in European Application No. 14775458.4.
(Continued)

*Primary Examiner* — Joseph D Anthony
(74) *Attorney, Agent, or Firm* — Harness, Dickey and Pierce, P.L.C.

(57) ABSTRACT

The invention provides a method of manufacturing a water-absorbent resin composition containing water-absorbent resin particles and additive particles, by which it is possible to obtain a water-absorbent resin composition that sufficiently exhibits additional functions, such as an anti-blocking property under moisture absorption, of the additive particles while maintaining an excellent water absorption property. A method of manufacturing a water-absorbent resin composition includes a resin particle preparation step and a mixing step. In the mixing step, water-absorbent resin particles which are prepared in the resin particle preparation step are mixed with additive particles in multiple stages by using a plurality of mixing apparatuses to obtain a water-absorbent resin composition.

5 Claims, 4 Drawing Sheets

(56) References Cited

U.S. PATENT DOCUMENTS

| | | | |
|---|---|---|---|
| 4,446,261 A | 5/1984 | Yamasaki et al. | |
| 5,985,944 A | 11/1999 | Ishizaki et al. | |
| 6,124,391 A | 9/2000 | Sun et al. | |
| 6,300,275 B1 | 10/2001 | Weir | |
| 6,348,257 B1 | 2/2002 | Koike et al. | |
| 2003/0020199 A1* | 1/2003 | Kajikawa | B29B 9/12 264/140 |
| 2003/0059521 A1 | 3/2003 | Gancet et al. | |
| 2005/0113252 A1* | 5/2005 | Miyake | A61L 15/18 502/402 |
| 2005/0118423 A1 | 6/2005 | Adachi et al. | |
| 2006/0073969 A1* | 4/2006 | Torii | A61L 15/60 502/400 |
| 2007/0225160 A1* | 9/2007 | Kitano | C08J 3/203 502/402 |
| 2009/0209683 A1* | 8/2009 | Reimann | A61L 15/60 524/35 |
| 2010/0130950 A1* | 5/2010 | Harren | A61L 15/60 604/358 |
| 2011/0118430 A1* | 5/2011 | Funk | A61L 15/60 526/317.1 |
| 2014/0031473 A1 | 1/2014 | Nogi et al. | |
| 2014/0197360 A1* | 7/2014 | Kitano | C08J 3/203 252/194 |

FOREIGN PATENT DOCUMENTS

| | | | |
|---|---|---|---|
| EP | 0234202 A1 | 9/1987 | |
| EP | 0450922 A2 | 10/1991 | |
| EP | 0450923 A2 | 10/1991 | |
| EP | 0450924 A2 | 10/1991 | |
| EP | 0480031 A1 | 4/1992 | |
| EP | 0 629 411 A1 | 12/1994 | |
| EP | 1257596 A1 | 11/2002 | |
| EP | 1512712 A1 | 3/2005 | |
| EP | 1840157 A1 | 10/2007 | |
| EP | 2135669 A1 | 12/2009 | |
| JP | 49-43395 B | 11/1974 | |
| JP | 51-125468 A | 11/1976 | |
| JP | 52-14689 A | 2/1977 | |
| JP | 57-021405 A | 2/1982 | |
| JP | 57-158209 A | 9/1982 | |
| JP | 62-172006 A | 7/1987 | |
| JP | 64-004653 A | 1/1989 | |
| JP | 9-241322 A | 9/1997 | |
| JP | 09-248454 A | 9/1997 | |
| JP | 10-120921 A | 5/1998 | |
| JP | 11-286611 A | 10/1999 | |
| JP | 2000-93792 A | 4/2000 | |
| JP | 2003-082107 A | 3/2003 | |
| JP | 2003-176421 A | 6/2003 | |
| JP | 2005-097604 A | 4/2005 | |
| JP | 2008-106218 A | 5/2008 | |
| TW | 200736304 A | 10/2007 | |
| WO | WO-2005/10102 A1 | 2/2005 | |
| WO | WO-2009/034153 A1 | 3/2009 | |
| WO | WO-2012/102407 A1 | 8/2012 | |

OTHER PUBLICATIONS

Extended European Search Report dated Nov. 7, 2016 issued in European Patent Application No. 14775458.4.

International Search Report dated May 13, 2014 issued in PCT/JP2014/052155—English Translation Only.

International Preliminary Report on Patentability dated Oct. 8, 2015 issued in PCT Patent Application No. PCT/JP2014/052155—with Full English Translation.

Office Action dated Feb. 23, 2017, issued in Taiwan Patent Application No. 103105152.

Office Action dated Oct. 10, 2017 issued in Japanese Patent Application No. 2015-508133.

\* cited by examiner

METHOD OF MANUFACTURING WATER-ABSORBENT RESIN COMPOSITION

PRIORITY STATEMENT

This application is a national stage application under 35 U.S.C. § 371 of PCT International Application No. PCT/JP2014/052155 which has an International filing date of 30 Jan. 2014, and claims priority under 35 U.S.C. §119 to Japanese Application No. 2013-067028 filed 27 Mar. 2013. The contents of each application recited above are incorporated herein by reference in their entirety.

TECHNICAL FIELD

The present invention relates to a method of manufacturing a water-absorbent resin composition, and particularly to a method of manufacturing a water-absorbent resin composition including a mixing step of mixing water-absorbent resin particles and additive particles.

BACKGROUND ART

Water-absorbent resin has been widely used for hygiene products such as disposable diaper and sanitary products, products for daily use such as sheets for pets, industrial materials such as water-absorbent pads for food, water-blocking materials for cables, and dew-catcher, water retention agents for greening, agriculture, and gardening, soil improvement agents, and the like. The water-absorbent resin is used particularly for hygiene products among the aforementioned use purposes.

Such water-absorbent resin is typically lightly-cross-linked copolymer. As water-absorbent resin, starch-based water-absorbent resin such as a starch-acrylonitrile graft copolymer hydrolysate (see Patent Literature 1) and a starch-acrylic acid graft copolymer neutralized product (see Patent Literature 2), a vinyl acetate-acrylic acid ester copolymer saponified product (see Patent Literature 3), a partially neutralized products of polyacrylic acid (see Patent Literatures 4, 5, and 6), and the like are known, for example.

As properties that the water-absorbent resin is to exhibit, an excellent water absorption property, an excellent handling property, and the like are exemplified. The excellent water absorption property means that an absorption capacity, an absorption rate, and liquid permeability when water-based liquid such as body fluid is brought into contact with the water-absorbent resin are satisfactory. In addition, the excellent handling property means that the water-absorbent resin exhibits excellent flowability even if the water-absorbent resin has absorbed moisture and only a small amount of water-absorbent resin adheres to equipment for manufacturing an absorbent material when the absorbent material is produced by using the water-absorbent resin and a fibrous material. Furthermore, the water-absorbent resin has been required to have additional functional properties such as an antibacterial property and a deodorizing property as a demand for disposable diapers for adults increases with the aging of the population.

Techniques of adding additive particles to water-absorbent resin particles have been proposed for the purpose of improving such a water-absorption property, a handling property, and additional functional properties. For example, techniques for improving anti-gel blocking property and liquid permeability when a diaper absorbs urine (see Patent Literatures 7 to 9), techniques for improving anti-blocking property under moisture absorption (see Patent Literatures 10 to 15), and techniques for providing an antibacterial property and a deodorizing property (see Patent Literatures 16 to 19) have been proposed. In addition, a technique of adding water-soluble metal soap powder to water-absorbent resin particles (see Patent Literature 20) and techniques of adding multivalent metal salt powder to water-absorbent resin particles (see Patent Literatures 21 and 22) have been proposed.

CITATION LIST

Patent Literature

Patent Literature 1: Japanese Examined Patent Publication JP-B 49-43395 (1974)
Patent Literature 2: Japanese Unexamined Patent Publication JP-A 51-125468 (1976)
Patent Literature 3: Japanese Unexamined Patent Publication JP-A 52-14689 (1977)
Patent Literature 4: Japanese Unexamined Patent Publication JP-A 62-172006 (1987)
Patent Literature 5: Japanese Unexamined Patent Publication JP-A 57-158209 (1982)
Patent Literature 6: Japanese Unexamined Patent Publication JP-A 57-21405 (1982)
Patent Literature 7: European Examined Patent Publication EP 629411
Patent Literature 8: Japanese Unexamined Patent Publication JP-A 2003-176421
Patent Literature 9: Japanese Unexamined Patent Publication JP-A 11-286611 (1999)
Patent Literature 10: Japanese Unexamined Patent Publication JP-A 2000-93792
Patent Literature 11: United States Examined Patent Publication U.S. Pat. No. 6,124,391
Patent Literature 12: United States Examined Patent Publication U.S. Pat. No. 5,985,944
Patent Literature 13: Japanese Unexamined Patent Publication JP-A 9-241322 (1997)
Patent Literature 14: Japanese Unexamined Patent Publication JP-A 64-4653 (1989)
Patent Literature 15: United States Unexamined Patent Publication US 2005/113252
Patent Literature 16: Pamphlet of International Publication WO 2005/10102
Patent Literature 17: Japanese Unexamined Patent Publication JP-A 9-248454 (1997)
Patent Literature 18: European Examined Patent Publication EP 1257596
Patent Literature 19: Japanese Unexamined Patent Publication JP-A 10-120921 (1998)
Patent Literature 20: United States Unexamined Patent Publication US 2005/118423
Patent Literature 21: United States Unexamined Patent Publication US 2006/73969
Patent Literature 22: United States Examined Patent Publication U.S. Pat. No. 6,300,275

SUMMARY OF INVENTION

Technical Problem

As a method of mixing water-absorbent resin particles and additive particles in producing a water-absorbent resin composition containing the water-absorbent resin particles and the additive particles is generally employed a dry blending method (a method of mixing powder), and accordingly a lot of continuous-type or batch-type powder mixing apparatuses that achieve the dry blending method have been proposed. There have been known powder mixing apparatuses such as a paddle blender, a ribbon blender, a rotary blender, a jar tumbler, a plunger mixer, a cylindrical mixing machine, a V-shaped mixing machine, a ribbon-type mixing machine, a screw-type mixing machine, a dual-armed mixing machine, a pulverization-type mixing machine, a groove-shaped mixing machine, a fork-shaped mixing machine, and an airflow-type mixing machine.

However, although techniques of providing various functions by adding additive particles to water-absorbent resin particles are known in the related art, the functions are not sufficient, and it is necessary to perform mixing for a long period of time by using a powder mixing apparatus and to use a large amount of additive particles for the purpose of uniformly mixing the additive particles, which brings about lowering of water absorption properties such as an absorption capacity under pressure.

In recent years, the scales of production equipment for water-absorbent resin have been increased and have been designed for continuous production in response to an increase in demand and a requirement for lowering costs. Thus, it has become necessary to mix additive particles into a large amount of water-absorbent resin particles in a short period of time. However, there is a problem that it is not possible to obtain a water-absorbent resin composition, in which the additive particles are uniformly dispersed, even if the particles are mixed for a long period of time and to cause the additive particles to sufficiently exhibit additional functions merely by increasing the scale of the equipment by using the powder mixing apparatus in the related art.

An object of the invention is to provide a method of manufacturing a water-absorbent resin composition containing water-absorbent resin particles and additive particles, by which it is possible to obtain a water-absorbent resin composition that sufficiently exhibits additional functions, such as an anti-blocking property under moisture absorption, of the additive particles while maintaining an excellent water absorption property.

Solution to Problem

The invention provides a method of manufacturing a water-absorbent resin composition containing water-absorbent resin particles and additive particles, the method including:

a resin particle preparation step of preparing water-absorbent resin particles; and a mixing step of mixing the water-absorbent resin particles which are prepared in the resin particle preparation step, with additive particles in multiple stages by using a plurality of mixing apparatuses and obtaining a water-absorbent resin composition.

In the method of manufacturing a water-absorbent resin composition of the invention, it is preferable that the mixing step includes a primary mixing stage of carrying out primary mixing of the water-absorbent resin particles with the additive particles by using a first mixing apparatus, and a secondary mixing stage of carrying out secondary mixing of a primary mixture which is obtained in the primary mixing stage, by using a second mixing apparatus until the additive particles are uniformly dispersed.

In the method of manufacturing a water-absorbent resin composition of the invention, it is preferable that the primary mixing stage includes a plurality of mixing stages.

In the method of manufacturing a water-absorbent resin composition of the invention, it is preferable that the mixing step includes a first transport mixing stage of vapor-phase transporting the primary mixture which is obtained in the primary mixing stage, from the first mixing apparatus to the second mixing apparatus through a first transport pipe disposed between the first mixing apparatus and the second mixing apparatus, while mixing the primary mixture in the first transport pipe, and a second transport mixing stage of vapor-phase transporting a secondary mixture which is obtained in the secondary mixing stage, from the second mixing apparatus through a second transport pipe which discharges the secondary mixture from the second mixing apparatus, while mixing the secondary mixture in the second transport pipe.

In the method of manufacturing a water-absorbent resin composition of the invention, it is preferable that the first mixing apparatus and the second mixing apparatus are based on different mixing schemes from each other.

In the method of manufacturing a water-absorbent resin composition of the invention, it is preferable that the additive particles are formed of an inorganic substance.

In the method of manufacturing a water-absorbent resin composition of the invention, it is preferable that in the primary mixing stage, a processing amount of the water-absorbent resin particles in one primary mixing processing is greater than 0 kg and equal to or less than 40000 kg.

Advantageous Effects of Invention

According to the invention, there is provided a method of manufacturing a water-absorbent resin composition containing water-absorbent resin particles and additive particles, the method including a resin particle preparation step and a mixing step. In the mixing step, the water-absorbent resin composition is obtained by mixing the water-absorbent resin particles which are prepared in the resin particle preparation step, with the additive particles in multiple stages by using a plurality of mixing apparatuses.

Since the water-absorbent resin particles and the additive particles are mixed by using the plurality of mixing apparatuses in the multiple stages in the method of manufacturing a water-absorbent resin composition of the invention, it is possible to obtain a water-absorbent resin composition in which the additive particles are uniformly dispersed, even in a short period of time without damaging surfaces of the water-absorbent resin particles. Accordingly, it is possible to obtain a water-absorbent resin composition that sufficiently exhibits additional functions such as anti-blocking property under moisture absorption, of the additive particles while maintaining an excellent water absorption property.

In a case where a large amount of water-absorbent resin composition is produced, and the water-absorbent resin particles and the additive particles are mixed in large-scaled production equipment, it becomes difficult to obtain a water-absorbent resin composition in which additive particles are uniformly dispersed. Since the water-absorbent resin particles and the additive particles are mixed in multiple stages by using a plurality of mixing apparatuses in the method of manufacturing a water-absorbent resin composition of the invention, it is possible to obtain a water-absorbent resin composition, in which the additive particles are uniformly dispersed, in a short period of time even in the case in which the water-absorbent resin particles and the additive particles are mixed in such large-scaled production equipment.

In addition, according to the invention, the mixing step includes a primary mixing stage and a secondary mixing stage. In the primary mixing stage, the water-absorbent resin particles and the additive particles are primarily mixed by using a first mixing apparatus. Then, in the secondary mixing stage, the primary mixture that is obtained in the primary mixing stage is secondarily mixed by using a second mixing apparatus until the additive particles are uniformly dispersed in the primary mixture. As described above, it is possible to obtain a water-absorbent resin composition in which the additive particles are uniformly dispersed, in a short period of time without damaging surfaces of the water-absorbent resin particles.

Further, according to the invention, the primary mixing stage includes a plurality of mixing stages. Since the primary mixing stage in which the water-absorbent resin particles and the additive particles are primarily mixed includes a plurality of mixing stages, it is possible to obtain the primary mixture by dividing the entire amount of the water-absorbent resin particles and the additive particles which are necessary raw materials for manufacturing the water-absorbent resin composition, into a plurality of parts and mixing the plurality of parts in the respective mixing stages in the primary mixing stage. By secondarily mixing the primary mixture which is obtained by dividing the water-absorbent resin particles and the additive particles into the plurality of parts by mixing the plurality of parts in the respective mixing stages in the primary mixing stage as described above, in the secondary mixing stage, it is possible to obtain a water-absorbent resin composition in which the additive particles are further uniformly dispersed, in a short period of time.

Furthermore, according to the invention, the mixing step further includes a first transport mixing stage and a second transport mixing stage. In the first transport mixing stage, the primary mixture that is obtained in the primary mixing stage is vapor-phase transported through a first transport pipe disposed between the first mixing apparatus and the second mixing apparatus, while mixing the primary mixture in the first transport pipe. In the second transport mixing stage, the secondary mixture that is obtained in the secondary mixing stage is vapor-phase transported through a second transport pipe which discharges the secondary mixture from the second mixing apparatus, while mixing the secondary mixture in the second transport pipe. Since the primary mixture obtained in the primary mixing stage using the first mixing apparatus is also mixed during vapor-phase transportation through the first transport pipe and the secondary mixture that is obtained in the secondary mixing stage using the second mixing apparatus is also mixed during vapor-phase transportation through the second transport pipe as described above, it is possible to obtain a water-absorbent resin composition in which the additive particles are further uniformly dispersed, in a short period of time.

According to the invention, the first mixing apparatus and the second mixing apparatus are based on different mixing schemes from each other. Since the first mixing apparatus that is used in the primary mixing stage for obtaining the primary mixture by primarily mixing the water-absorbent resin particles and the additive particles and the second mixing apparatus that is used in the secondary mixing stage for obtaining the secondary mixture by secondarily mixing the primary mixture are based on the different mixing schemes from each other as described above, it is possible to obtain a water-absorbent resin composition in which the additive particles are further uniformly dispersed, in a short period of time.

According to the invention, the additive particles that are mixed into the water-absorbent resin particles are formed of an inorganic substance. Even in a case of using such an inorganic substance as the additive particles, it is possible to obtain a water-absorbent resin composition in which the inorganic substance particles are uniformly dispersed, in a short period of time.

According to the invention, in the primary mixing stage for obtaining the primary mixture by primarily mixing the water-absorbent resin particles and the additive particles, the processing amount of water-absorbent resin particles in one primary mixing processing is greater than 0 kg and equal to or less than 40000 kg. In doing so, it is possible to improve dispersibility of the additive particles in the primary mixture that is obtained in the primary mixing stage.

BRIEF DESCRIPTION OF DRAWINGS

Other and further objects, features, and advantages of the invention will be more explicit from the following detailed description taken with reference to the drawings wherein.

DESCRIPTION OF EMBODIMENTS

Hereinafter, a detailed description will be given of preferred embodiments of the invention with reference to drawings.

Although a detailed description of the invention will be given below, the scope of the invention is not limited to the description, and the invention can be implemented by appropriately adding amendments other than the examples described below without departing from the gist of the invention.

Figure 1:
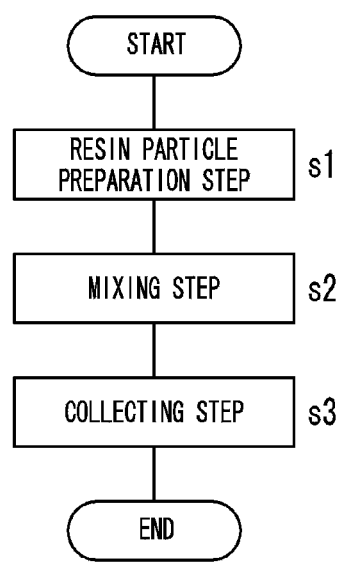
FIG. 1 is a process diagram illustrating a method of manufacturing a water-absorbent resin composition according to an embodiment of the invention.

FIG. 1 is a process diagram illustrating a method of manufacturing a water-absorbent resin composition according to an embodiment of the invention. The method of manufacturing a water-absorbent resin composition according to the embodiment is a method of manufacturing a water-absorbent resin composition containing water-absorbent resin in the form of particles (hereinafter, referred to as "water-absorbent resin particles") and additives in the form of particles (hereinafter, referred to as "additive particles"), and the method includes a resin particle preparation step s1, a mixing step s2, and a collecting step s3.

[Resin Particle Preparation Step]

Figure 2:
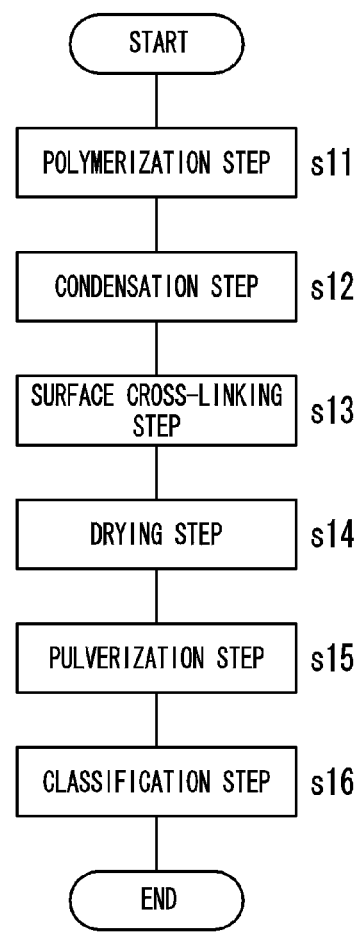
FIG. 2 is a process diagram illustrating an example of details of the resin particle preparation step s1.

FIG. 2 is a process diagram illustrating an example of details of the resin particle preparation step s1. The resin particle preparation step s1 is a step of preparing the water-absorbent resin particles and includes, for example, a polymerization step s11, a condensation step s12, a surface-crosslinking step s13, a drying step s14, a pulverization step s15, and a classification step s16 as illustrated in FIG. 2.

<Polymerization Step>

The polymerization step s11 is a step of obtaining water-absorbent resin by causing a polymerization reaction of a water-soluble ethylenically-unsaturated monomer. A polymerization method of the water-soluble ethylenically-unsaturated monomer is not particularly limited, and a representative polymerization method such as an aqueous solution polymerization method, an emulsion polymerization method, or a reverse-phase suspension polymerization method is used.

In the aqueous solution polymerization method, polymerization is performed by heating an aqueous solution of a water-soluble ethylenically-unsaturated monomer, an internal-crosslinking agent, and a water-soluble radical polymerization initiator while stirring the materials as necessary. In the aqueous solution polymerization method, water is handled as a liquid medium, and the polymerization reaction is performed by maintaining the water-soluble ethylenically-unsaturated monomer in a state of an aqueous solution.

In the reverse-phase suspension polymerization method, polymerization is performed by heating an aqueous solution of a water-soluble ethylenically-unsaturated monomer, a surfactant, a hydrophobic polymeric dispersing agent, a water-soluble radical polymerization initiator, and an internal-crosslinking agent, for example, in a petroleum-based hydrocarbon dispersion medium while stirring the materials. In the reverse-phase suspension polymerization method, water and the petroleum-based hydrocarbon dispersion medium are handled as liquid mediums, and the polymerization reaction is performed by adding the aqueous solution of the water-soluble ethylenically-unsaturated monomer to the petroleum-based hydrocarbon dispersion medium.

It is preferable to employ the reverse-phase suspension polymerization method in this embodiment from a viewpoint that it is possible to finely control the polymerization reaction and to widely control a range of particle diameters. Hereinafter, a description will be given of a method of manufacturing water-absorbent resin by the reverse-phase suspension polymerization method as an exemplary embodiment of the invention.

Examples of the water-soluble ethylenically-unsaturated monomer that is used as a raw material of the water-absorbent resin include monomers containing an acid group such as a (meth)acrylic acid ["(meth)acryl" means "acryl" and "methacryl"; the same is true for the following description], a 2-(meth)acrylamide-2-methylpropanesulfonic acid, or a maleic acid, and salts thereof; nonionic unsaturated monomers such as (meth)acrylamide, N,N-dimethyl (meth)acrylamide, 2-hydroxyethyl (meth)acrylate, and N-methylol (meth)acrylamide; amino group-containing unsaturated monomers such as diethylaminoethyl (meth)acrylate and diethylaminopropyl (meth)acrylate and quaternized products thereof. Each of these water-soluble ethylenically-unsaturated monomers may be used alone, or two or more thereof may be used in combination.

In addition, examples of an alkaline compound that is used when a salt is obtained by neutralizing a monomer containing an acid group include compounds of lithium, sodium, potassium, and ammonium. More specifically, examples thereof include sodium hydroxide, potassium hydroxide, lithium hydroxide, sodium carbonate, and ammonium carbonate.

Preferable examples among the water-soluble ethylenically-unsaturated monomers include a (meth)acrylic acid and a salt thereof from a viewpoint that it is possible to easily industrially obtain the (meth)acrylic acid and the salt thereof.

In a case of neutralizing a monomer containing an acid group, a degree of neutralization preferably ranges from 30 to 90 mol % of the acid group of the water-soluble ethylenically-unsaturated monomer. When the degree of neutralization is equal to or greater than 30 mol %, the acid group is easily ionized, and it is possible to suppress lowering in water absorption capacity. When the degree of neutralization is equal to or less than 90 mol %, it is possible to suppress the occurrence of a problem in safety, for example, in a case that a water-absorbent resin composition is used for a hygiene product.

In the embodiment, the water-soluble ethylenically-unsaturated monomer is used as an aqueous solution. The monomer concentration in the water-soluble ethylenically-unsaturated monomer solution preferably ranges from 20% by mass to a saturating concentration.

The aqueous solution of the water-soluble ethylenically-unsaturated monomer may contain a chain transfer agent, a thickener, and the like as necessary. Examples of the chain transfer agent include compounds such as thiols, thiol acids, secondary alcohols, hypophosphorous acid, and phosphorous acid. Each of these chain transfer agents may be used alone, or two or more thereof may be used in combination. Examples of the thickener include carboxymethyl cellulose, hydroxyethyl cellulose, hydroxypropyl cellulose, methyl cellulose, polyethylene glycol, polyacrylic acid, a polyacrylic acid neutralized product, and polyacrylamide.

Examples of the petroleum-based hydrocarbon dispersion medium include aliphatic hydrocarbon containing 6 to 8 carbon atoms such as n-hexane, n-heptane, 2-methylhexane, 3-methylhexane, 2,3-dimethylpentane, 3-ethylpentane, and n-octane; alicyclic hydrocarbon such as cyclohexane, methylcyclohexane, cyclopentane, methylcyclopentane, trans-1,2-dimethylcyclopentane, cis-1,3-dimethylcyclopentane, and trans-1,3-dimethylcyclopentane; and aromatic hydrocarbon such as benzene, toluene, and xylene. Among these examples, aliphatic hydrocarbon containing 6 to 8 carbon atoms such as n-hexane, n-heptane, 2-methylhexane, 3-methylhexane, and n-octane; and alicyclic hydrocarbon containing 6 to 8 carbon atoms such as cyclohexane, methylcyclopentane, and methylcyclohexane are preferably used from a viewpoint that it is possible to easily industrially obtain the materials and from a viewpoint of safety. Each of these petroleum-based hydrocarbon dispersion mediums may be used alone, or two or more thereof may be used in combination.

Furthermore, n-heptane and cyclohexane are preferably used among these petroleum-based hydrocarbon dispersion mediums from a viewpoint that reverse-phase suspension states thereof are satisfactory, that preferable particle diameters are easily obtained, that n-heptane and cyclohexane can be easily industrially obtained, and that quality thereof is stable. When commercially available EXXSOL Heptane (manufactured by Exxon Mobil Corporation; containing 75 to 85% of hydrocarbon of n-heptane and isomer), for example, is used as an example of the aforementioned mixture of hydrocarbon, a satisfactory result can be achieved.

The amount of the petroleum-based hydrocarbon dispersion medium used is preferably 50 to 600 parts by mass, more preferably 50 to 400 parts by mass, and further more preferably 50 to 200 parts by mass with respect to 100 parts by mass of the aqueous solution of the water-soluble ethylenically-unsaturated monomer from a viewpoint of uniformly dispersing the aqueous solution of the water-soluble ethylenically-unsaturated monomer and facilitating control of a polymerization temperature.

In the reverse-phase suspension polymerization, a surfactant and, if necessary, a hydrophobic polymeric dispersing agent are used for obtaining more stable polymerized particles by dispersing the aqueous solution of the water-soluble ethylenically-unsaturated monomer in the petroleum-based hydrocarbon dispersion medium. The timing at which the surfactant and the hydrophobic polymeric dispersing agent are respectively added is not particularly limited as long as it is possible to cause the surfactant and the hydrophobic polymeric dispersing agent to be present before the polymerization of the aqueous solution of the water-soluble ethylenically-unsaturated monomer, to sufficiently disperse the aqueous solution of the water-soluble ethylenically-unsaturated monomer in the petroleum-based hydrocarbon dispersion medium, and to perform polymerization after stabilizing liquid droplets thereof, from a viewpoint of stably completing the polymerization without causing any disorders. Although there are also exceptional cases in the related art, the surfactant and the hydrophobic polymeric dispersing agent are typically dissolved or dispersed in advance in the petroleum-based hydrocarbon dispersion medium before adding the aqueous solution of the ethylenically-unsaturated monomer.

Examples of the surfactant that is used for maintaining dispersion stability during the polymerization include nonionic surfactants such as sorbitan-fatty acid ester, polyoxyethylene sorbitan-fatty acid ester, polyglycerin-fatty acid ester, polyoxyethylene glycerin-fatty acid ester, sucrose-fatty acid ester, sorbitol-fatty acid ester, polyoxyethylene sorbitol-fatty acid ester, polyoxyethylene alkyl ether, polyoxyethylene alkyl phenyl ether, polyoxyethylene castor oil, polyoxyethylene-hardened castor oil, alkyl aryl formaldehyde-condensed polyoxyethylene ether, polyoxyethylene polyoxypropyl alkyl ether, polyethylene glycol-fatty acid ester, alkyl glucoside, N-alkyl gluconamide, polyoxyethylene-fatty acid amide, and polyoxyethylene alkyl amine; and anionic surfactants such as a fatty acid salt, alkyl benzene sulfonate, alkyl methyltaurate, a polyoxyethylene alkyl phenyl ether sulfate ester salt, a polyoxyethylene alkyl ether sulfate ester salt, a polyoxyethylene alkyl ether sulfonic acid and a salt thereof, a polyoxyethylene alkyl phenyl ether phosphoric acid and a salt thereof, and a polyoxyethylene alkyl ether phosphoric acid and a salt thereof. Each of these surfactants may be used alone, or two or more thereof may be used in combination.

Among these surfactants, at least one selected from a group consisting of polyglycerin-fatty acid ester, sucrose-fatty acid ester, and sorbitan-fatty acid ester is preferably used from a viewpoint of dispersion stability of the aqueous solution of the monomer.

The addition amount of the surfactant used is preferably 0.01 to 5 parts by mass and more preferably 0.05 to 3 parts by mass with respect to 100 parts by mass of the aqueous solution of the water-soluble ethylenically-unsaturated monomer. When the addition amount of the surfactant is equal to or greater than 0.01 part by mass, it is possible to suppress lowering in the dispersion stability of the aqueous solution of the water-soluble ethylenically-unsaturated monomer. The addition amount that is equal to or less than 5 parts by mass is economically advantageous.

In order to further enhance the dispersion stability during the polymerization, a hydrophobic polymeric dispersing agent may be used along with the surfactant. It is preferable to select and use a hydrophobic polymeric dispersing agent that is dissolved or dispersed in the petroleum-based hydrocarbon dispersion medium used, and examples thereof include a hydrophobic polymeric dispersing agent with a viscosity-average molecular weight of equal to or less than 20000, preferably of equal to or less than 10000, and further preferably of equal to or less than 5000. Specific examples thereof include maleic anhydride-modified polyethylene, maleic anhydride-modified polypropylene, a maleic anhydride-modified ethylene-propylene copolymer, a maleic anhydride-ethylene copolymer, a maleic anhydride-propylene copolymer, a maleic anhydride-ethylene-propylene copolymer, polyethylene, polypropylene, an ethylene-propylene copolymer, oxidized polyethylene, oxidized polypropylene, an oxidized ethylene-propylene copolymer, an ethylene-acrylic acid copolymer, ethyl cellulose, anhydrous maleated polybutadiene, and anhydrous maleated EPDM (ethylene/propylene/diene terpolymer).

Among these hydrophobic polymeric dispersing agent, at least one selected from a group consisting of maleic anhydride-modified polyethylene, maleic anhydride-modified polypropylene, a maleic anhydride-modified ethylene-propylene copolymer, a maleic anhydride-ethylene copolymer, a maleic anhydride-propylene copolymer, a maleic anhydride-ethylene-propylene copolymer, polyethylene, polypropylene, an ethylene-propylene copolymer, oxidized polyethylene, oxidized polypropylene, and an oxidized ethylene-propylene copolymer is preferably used.

The addition amount of the hydrophobic polymeric dispersing agent is preferably 0 to 5 parts by mass, more preferably 0.01 to 3 parts by mass, and further preferably 0.05 to 2 parts by mass with respect to 100 parts by mass of the aqueous solution of the water-soluble ethylenically-unsaturated monomer. The addition amount of the hydrophobic polymeric dispersing agent that is equal to or less than 5 parts by mass is economically advantageous.

The aqueous solution of the water-soluble ethylenically-unsaturated monomer is dispersed by a stirring unit when added to and dispersed in the petroleum-based hydrocarbon dispersion medium that is charged in advance in a polymerization reaction vessel. However, conditions of the stirring by the stirring unit differ depending on a desired diameter of dispersion liquid droplets and cannot be unconditionally determined. The diameter of dispersion liquid droplets can be adjusted by a type of a stirring blade in the stirring unit, a diameter of the blade, a rotation frequency, and the like. As the stirring blade, it is possible to use, for example, a propeller blade, a paddle blade, an anchor blade, a turbine blade, a Pfaudler blade, a ribbon blade, a FULLZONE blade (manufactured by Shinko Pantec Kabushiki Kaisha), a MAXBLEND blade (manufactured by Sumitomo Heavy Industries, Ltd.), or a SUPER-MIX (manufactured by Satake Chemical Equipment Mfg., Ltd.)

In the polymerization reaction vessel, the aqueous solution of the water-soluble ethylenically-unsaturated monomer that has been added to the petroleum-based hydrocarbon dispersion medium at a predetermined addition velocity is sufficiently stirred by the stirring unit and dispersed in the petroleum-based hydrocarbon dispersion medium in the presence of the surfactant, and the liquid droplets are stabilized. Then, the inside of the polymerization reaction vessel is sufficiently substituted with nitrogen, reverse-phase suspension polymerization is performed by using a water-soluble radical polymerization initiator in the presence of an internal-crosslinking agent, if necessary, and a suspension of a crosslinked polymer in the form of a water-containing gel is obtained.

Examples of the water-soluble radical polymerization initiator used in the embodiment include persulfate such as potassium persulfate, ammonium persulfate, and sodium persulfate; peroxide such as hydrogen peroxide; and azo compounds such as 2,2'-azobis (2-amidinopropane) dihydrochloride, 2,2'-azobis [N-(2-carboxyethyl)-2-methylpropiondiamine]tetrahydrate, 2,2'-azobis (1-imino-1-pyrrolidino-2-methylpropane) dihydrochloride, and 2,2'-azobis[2-methyl-N-(2-hydroxyethyl)-propionamide].

Among these water-soluble radical polymerization initiators, potassium persulfate, ammonium persulfate, sodium persulfate, and 2,2'-azobis (2-amidinopropane) dihydrochloride are preferably used from a viewpoint that it is possible to easily obtain and handle these materials.

In addition, the water-soluble radical polymerization initiator may be used as a redox polymerization initiator along with a reducing agent such as sulfite or an ascorbic acid.

The amount of the water-soluble radical polymerization initiator used is typically 0.01 to 1 part by mass with respect to 100 parts by mass of the water-soluble ethylenically-unsaturated monomer. When the amount thereof is equal to or greater than 0.01 part by mass, it is possible to suppress a decrease in a polymerization degree. When the amount thereof is equal to or less than 1 part by mass, it is possible to suppress the occurrence of an abrupt polymerization reaction.

Although timing of adding the water-soluble radical polymerization initiator is not particularly limited, it is preferable to add the water-soluble radical polymerization initiator in advance in the aqueous solution of the water-soluble ethylenically-unsaturated monomer.

Examples of the internal-crosslinking agent that is used as necessary include polyols such as (poly)ethylene glycol ["(poly)" means both the cases where the prefix "poly" is present and absent; the same is true for the following description], 1,4-butanediol, glycerin, and trimethylolpropane, unsaturated polyesters containing two or more vinyl groups that are obtained by reacting polyols with an unsaturated acid such as an acrylic acid or methacrylic acid, bisacrylamides such as N,N'-methylenebisacrylamide, and polyglycidyl compounds containing two or more glycidyl groups such as (poly)ethylene glycol diglycidyl ether, (poly)ethylene glycol triglycidyl ether, (poly)glycerin diglycidyl ether, (poly) glycerin triglycidyl ether, (poly)propylene glycol polyglycidyl ether, and (poly)glycerol polyglycidyl ether. Each of these internal-crosslinking agents may be used alone, or two or more thereof may be used in combination.

The addition amount of the internal-crosslinking agent is preferably 0 to 3 parts by mass, more preferably 0 to 1 part by mass, and further preferably 0.001 to 0.1 part by mass with respect to 100 parts by mass of the water-soluble ethylenically-unsaturated monomer. When the addition amount is equal to or less than 3 parts by mass, it is possible to suppress excessive crosslinking and to suppress an excessive lowering in the water absorption performance. The internal-crosslinking agent is preferably added in advance to the aqueous solution of the water-soluble ethylenically-unsaturated monomer.

Although a reaction temperature of the reverse-phase suspension polymerization in the polymerization reaction vessel varies depending on a type and an amount of the polymerization initiator used and cannot be unconditionally determined, the reaction temperature is preferably 30 to 100° C. and more preferably 40 to 90° C. When the reaction temperature is equal to or greater than 30° C., it is possible to suppress a decrease in the polymerization degree. When the reaction temperature is equal to or less than 100° C., it is possible to suppress the occurrence of an abrupt polymerization reaction.

The thus obtained polymerization reaction solution containing the crosslinked polymer in the form of a water-containing gel (a suspension of the crosslinked polymer in the form of a water-containing gel) may be regarded as a resultant of polymerization in the first stage, and thereafter, "multiple-stage polymerization" may be performed in which the aqueous solution of the water-soluble ethylenically-unsaturated monomer is added several times and the polymerization is repeatedly performed. For use as a hygiene material, in particular, it is preferable to perform the two-stage polymerization (means twice) from a viewpoint of the size of the obtained water-absorbent resin particles and production efficiency.

In relation to the size of particles obtained by the polymerization of the water-soluble ethylenically-unsaturated monomer in the first stage, a median particle diameter is preferably 20 to 200 μm, more preferably 30 to 150 μm, and further preferably 40 to 100 μm from a viewpoint of obtaining a moderate agglomerated particle diameter in the multiple-stage polymerization. The median particle diameter of the polymerized particles in the first stage can be measured by dehydrating and drying the particles after completion of the polymerization in the first stage.

In the case of performing the two-stage polymerization, it is possible to agglomerate the particles obtained in the polymerization in the first stage and to obtain water-absorbent resin with a relatively large average particle diameter that is suitable for use in a hygiene product by performing a method which will be described later.

At this time, it is necessary to reduce an effect of the surfactant so as not to cause the aqueous solution of the water-soluble ethylenically-unsaturated monomer used in the polymerization in the second stage to form independent liquid droplets. It is possible to obtain the aforementioned agglomerated particles by cooling the particles after the completion of the polymerization in the first stage and adding the aqueous solution of the water-soluble ethylenically-unsaturated monomer for the polymerization in the second stage at a temperature at which at least a part of the surfactant is precipitated, for example.

In addition, the invention is not limited to the aforementioned method as long as it is possible to obtain the agglomerated particles by adding the aqueous solution of the water-soluble ethylenically-unsaturated monomer for the polymerization in the second stage.

In addition, it is possible to further reduce the remaining amount of the petroleum-based hydrocarbon dispersion medium in the water-absorbent resin by adding the aqueous solution of the water-soluble ethylenically-unsaturated monomer for the polymerization in the second stage after reducing the surface action of the surfactant as described above.

Although as the water-soluble ethylenically-unsaturated monomer for the polymerization in the second stage, it is possible to use the same water-soluble ethylenically-unsaturated monomer as the exemplified water-soluble ethylenically-unsaturated monomer for the polymerization in the first stage, the type of the monomer, a degree of neutralization, and concentrations of a neutralizing salt and the aqueous solution of the monomer may be the same as or different from those of the water-soluble ethylenically-unsaturated monomer for the polymerization in the first stage.

As a polymerization initiator added to the aqueous solution of the water-soluble ethylenically-unsaturated monomer for the polymerization in the second stage, a polymerization initiator can be selected and used among the above examples in relation to the water-soluble ethylenically-unsaturated monomer for the polymerization in the first stage.

An internal-crosslinking agent, a chain transfer agent, and the like may also be added to the aqueous solution of the water-soluble ethylenically-unsaturated monomer for the polymerization in the second stage as necessary, and an internal-crosslinking agent, a chain transfer agent, and the like can be selected and used among the above examples in relation to the water-soluble ethylenically-unsaturated monomer for the polymerization in the first stage.

The addition amount of the water-soluble ethylenically-unsaturated monomer for the polymerization in the second stage is preferably 50 to 300 parts by mass, more preferably 100 to 200 parts by mass, and most preferably 120 to 160 parts by mass with respect to 100 parts by mass of the water-soluble ethylenically-unsaturated monomer for the polymerization in the first stage from a view point of obtaining appropriate agglomerated particles.

Stirring by the stirring unit in the reverse-phase suspension polymerization in the second stage may be performed in any manner as long as the whole system is uniformly mixed. The agglomerated particle diameters can be changed by a precipitation state of the surfactant and the amount of the water-soluble ethylenically-unsaturated monomer for the polymerization in the second stage with respect to the amount of the water-soluble ethylenically-unsaturated monomer for the polymerization in the first stage. In addition, the agglomerated particle diameter in the water-absorbent resin that is preferably used in a hygiene product is preferably 200 to 600 μm, more preferably 250 to 500 μm, and most preferably 300 to 450 μm.

Although a reaction temperature of the reverse-phase suspension polymerization in the second stage also differs depending on the type and the amount of the polymerization initiator and cannot be unconditionally determined, the reaction temperature is preferably 30 to 100° C. and more preferably 40 to 90° C. In a case of performing multiple-stage polymerization of two or more stages, it is possible to execute the multiple-stage polymerization thereafter by regarding the polymerization in the second stage in the above description as polymerization in the third or fourth stage.

<Condensation Step>

The condensation step s12 is a step of distilling away a liquid component from the polymerization reaction solution obtained in the polymerization step s11 and condensing the polymerization reaction solution.

The processing of distilling away the liquid component from the polymerization reaction solution in the condensation step s12 may be performed under ordinary pressure or reduced pressure, or may be performed in an airflow of nitrogen or the like in order to enhance the efficiency of distilling away the liquid component.

In a case of performing the processing of distilling away the liquid component from the polymerization reaction solution under ordinary pressure, a setting temperature during the condensation is preferably 70 to 250° C., more preferably 80 to 180° C., further preferably 80 to 140° C., and most preferably 90 to 130°. In a case of performing the processing of distilling away the liquid component from the polymerization reaction solution under reduced pressure, the setting temperature during the condensation is preferably 60 to 100° C. and more preferably 70 to 90° C.

<Surface-Crosslinking Step>

The surface-crosslinking step s13 is a step of adding a surface-crosslinking agent which contains two or more functional groups that are reactive with a functional group derived from the water-soluble ethylenically-unsaturated monomer, during the processing of distilling away the liquid composition from the polymerization reaction solution and increasing crosslinking densities in surface layers of the water-absorbent resin particles. By adding the surface-crosslinking agent and causing a reaction after the polymerization, it is possible to increase the crosslinking densities in the surface layers of the water-absorbent resin particles, to enhance various performances such as water absorption capacity under pressure, a water absorption rate, and gel strength, and to provide performances that are suitable for use in a hygiene product.

The surface-crosslinking agent used for the crosslinking reaction is not particularly limited as long as the surface-crosslinking agent can react with the functional group derived from the water-soluble ethylenically-unsaturated monomer used in the polymerization.

Examples of the surface-crosslinking agent used include polyols such as ethylene glycol, propylene glycol, 1,4-butanediol, trimethylolpropane, glycerin, polyoxyethylene glycol, polyoxypropylene glycol, and polyglycerin; polyglycidyl compounds such as (poly)ethylene glycol diglycidyl ether, (poly)ethylene glycol triglycidyl ether, (poly)glycerin diglycidyl ether, (poly)glycerin triglycidyl ether, (poly)propylene glycol polyglycidyl ether, and (poly)glycerol polyglycidyl ether; halo epoxy compounds such as epichlorohydrin, epibromhydrin, and α-methylepichlorohydrin; compounds containing two or more reactive functional groups such as isocyanate compounds including 2,4-tolylene diisocyanate and hexamethylene diisocyanate; oxetane compounds such as 3-methyl-3-oxetane methanol, 3-ethyl-3-oxetane methanol, 3-butyl-3-oxetane methanol, 3-methyl-3-oxetane ethanol, 3-ethyl-3-oxetane ethanol, and 3-butyl-3-oxetane ethanol; oxazoline compounds such as 1,2-ethylenebisoxazoline; and carbonate compounds such as ethylene carbonate. Each of these surface-crosslinking agents may be used alone, or two or more thereof may be used in combination.

Among these surface-crosslinking agents, polyglycidyl compounds such as (poly)ethylene glycol diglycidyl ether, (poly)ethylene glycol triglycidyl ether, (poly)glycerin diglycidyl ether, (poly)glycerin triglycidyl ether, (poly)propylene glycol polyglycidyl ether, and (poly)glycerol polyglycidyl ether are preferably used from a viewpoint of excellent reactivity.

The addition amount of the surface-crosslinking agent is preferably 0.01 to 5 parts by mass and more preferably 0.02 to 3 parts by mass with respect to 100 parts by mass in total of the water-soluble ethylenically-unsaturated monomer added for the polymerization. When the addition amount of the surface-crosslinking agent is equal to or greater than 0.01 part by mass, it is possible to enhance various performances, such as water absorption capacity under pressure, a water absorption rate, and gel strength, of the obtained water-absorbent resin. When the addition amount thereof is equal to or less than 5 parts by mass, it is possible to suppress an excessive decrease in water absorption capacity.

Furthermore, although the surface-crosslinking agent itself may be added or the surface-crosslinking agent may be added in the form of an aqueous solution in relation to a method of adding the surface-crosslinking agent, the surface-crosslinking agent may be added as a solution in which a hydrophilic organic medium is used as a medium as necessary. Examples of the hydrophilic organic medium include lower alcohols such as methyl alcohol, ethyl alcohol, n-propyl alcohol, isopropyl alcohol, and propylene glycol; ketones such as acetone and methyl ethyl ketone; ethers such as diethyl ether, dioxane, and tetrahydrofuran; amides such as N,N-dimethylformamide; and sulfoxides such as dimethyl sulfoxide. Each of these hydrophilic organic mediums may be used alone, or two or more thereof may be used in combination.

The timing at which the surface-crosslinking agent is added is not particularly limited as long as the surface-crosslinking agent is added after completion of the polymerization. The surface-crosslinking reaction is preferably performed in the presence of water within a range of 1 to 200 parts by mass, is more preferably performed in the presence of water within a range of 5 to 100 parts by mass, and is further preferably performed in the presence of water within a range of 10 to 50 parts by mass with respect to 100 parts by mass of water-absorbent resin during the processing of distilling away the liquid component from the polymerization reaction solution. By adjusting the water amount when the surface-crosslinking agent is added as described above, it is possible to more suitably perform the surface-crosslinking in the particle surface layer of the water-absorbent resin and to exhibit an excellent water absorption performance.

A temperature of the surface-crosslinking reaction is preferably 50 to 250° C., more preferably 60 to 180° C., further preferably 60 to 140° C., and most preferably 70 to 120° C.

The polymer obtained through the polymerization step s11, the condensation step s12, and the surface-crosslinking step s13 as described above is typically a crosslinked polymer in the form of a water-containing gel, and drying processing, pulverization processing, and classification processing are performed thereon as necessary.

<Drying Step>

The drying step s14 is a step of drying the crosslinked polymer in the form of a water-containing gel obtained in the surface-crosslinking step s13.

As a method of the drying processing in the drying step s14, various methods such as drying by heating, hot-air drying, reduced-pressure drying, infrared ray drying, microwave drying, dehydration by azeotropy with a hydrophobic organic medium, and high-moisture drying using high-temperature water vapor can be employed so as to achieve a targeted water content, and the method is not particularly limited. In a case of performing hot-air drying in the drying processing, the hot-air drying is typically performed in a temperature range (hot-air temperature) of 60 to 250° C., is preferably performed in a temperature range of 100 to 220° C., and is more preferably performed in a temperature range of 120 to 200° C. Drying time depends on a surface area and water content of the polymer and a type of a dryer and is selected so as to achieve a targeted water content. For example, the drying time may be appropriately selected within a range of 1 minute to 5 hours.

A moisture content in the water-absorbent resin particles that can be employed in the invention is preferably equal to or less than 20% by mass and more preferably equal to or less than 10% by mass. When the moisture rate in the water-absorbent resin particles is equal to or less than 20% by mass, the water-absorbent resin particles can maintain satisfactory flowability.

<Pulverization Step>

The pulverization step s15 is a step of pulverizing particle-shaped dried aggregate in the form of particles or powder that is obtained in the drying step s14 by using a pulverization machine. Although the pulverization machine that is used in the pulverization step s15 is not particularly limited, examples thereof include a roll-type pulverization machine such as a roll mill, a hammer-type pulverization machine such as a hammer mill, an impact-type pulverization machine, a cutter mill, a turbo grinder, a ball mill, and a flush mill. Among these pulverization machines, a roll mill is preferably used to control particle size distribution. In order to control the particle size distribution, pulverization may be continuously performed twice or more, or may be performed three or more times. In a case of performing the pulverization twice or more, the same pulverization machine may be used, or alternatively, different pulverization machines may be used. In addition, different types of pulverization machines may be used in combination.

<Classification Step>

The classification step s16 is a step of classifying grinded substances obtained in the pulverization step s15. The grinded substances are sieved in the classification step s16. In the classification step s16, the targeted water-absorbent resin particles are obtained by selecting particles with desired particle diameters (preferably with weight-average particle diameters of 200 to 800 μm). A classification method is not particularly limited, and a method that is known in the related art can be employed. Although not particularly limited, it is preferable to use sieve classification (a metal sieve made of stainless steel). For the purpose of achieve a targeted physical property and granularity, it is preferable to use a plurality of sieves at the same time in the classification step s16.

The water-absorbent resin particles that are prepared in the resin particle preparation step s1 including the polymerization step s11, the condensation step s12, the surface-crosslinking step s13, the drying step s14, the pulverization step s15, and the classification step s16 as described above are subjected to the mixing step s2.

[Mixing Step]

Figure 3:
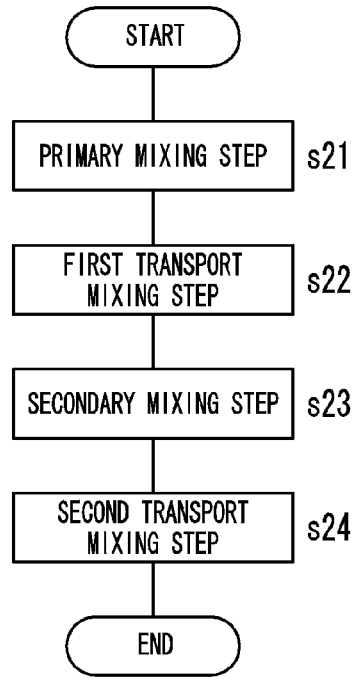
FIG. 3 is a process diagram illustrating an example of details of the mixing step s2.
Figure 4:
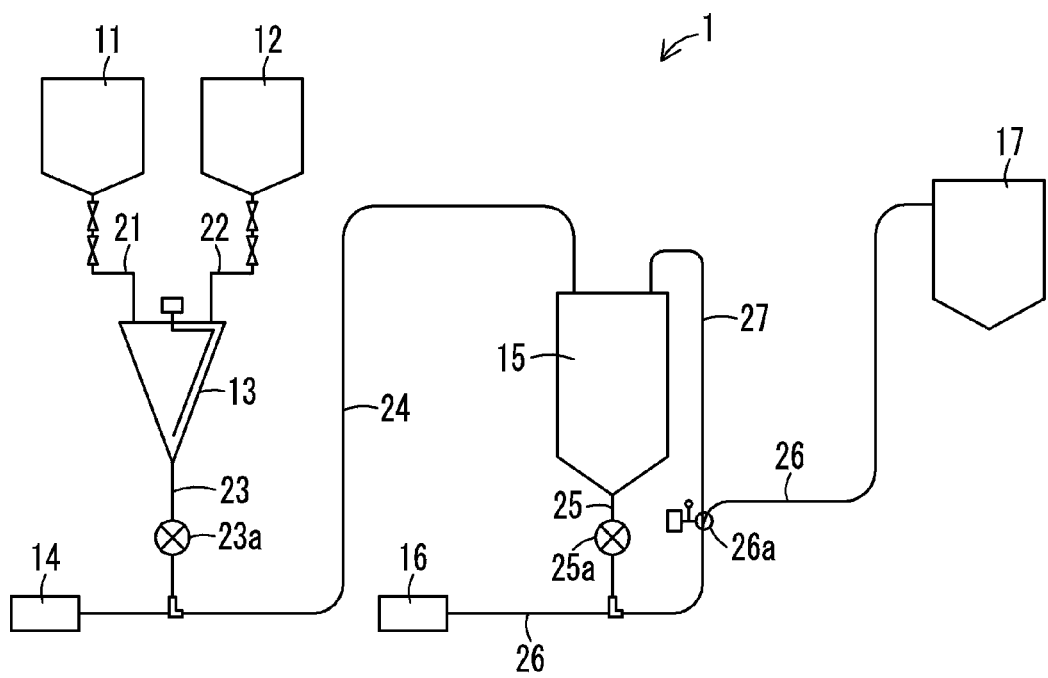
FIG. 4 is a diagram illustrating an example of a configuration of mixing equipment 1 for performing the mixing step s2.

FIG. 3 is a process diagram illustrating an example of details of the mixing step s2. FIG. 4 is a diagram illustrating an example of a configuration of mixing equipment 1 for performing the mixing step s2. The mixing step s2 is a process of obtaining a water-absorbent resin composition by mixing the water-absorbent resin particles prepared in the resin particle preparation step s1 and additive particles in multiple stages by using a plurality of mixing apparatuses, and includes, for example, a primary mixing step s21, a first transport mixing step s22, a secondary mixing step s23, and a second transport mixing step s24 as illustrated in FIG. 3. In addition, the respective steps in the mixing step s2 are performed by the mixing equipment 1 illustrated in FIG. 4, for example.

The mixing equipment 1 is configured to include an additive particle hopper 11, a water-absorbent resin particle hopper 12, a first mixing apparatus 13, a first compressor 14, a second mixing apparatus 15, a second compressor 16, and a water-absorbent resin composition hopper 17.

The additive particle hopper 11 accommodates the additive particles. The additive particles accommodated in the additive particle hopper 11 are not particularly limited as long as the additive particles are powder that can provide an additional function such as an anti-blocking property under moisture absorption to the manufactured water-absorbent resin composition, and knowledge in the related art can be appropriately referred to. Examples of the additive particles include powder made of an organic substance (organic powder) such as pulp powder, a cellulose derivative, and natural polysaccharide, powder made of an inorganic substance (inorganic powder), an antioxidant, an antiseptic agent, a sanitizing agent, a surfactant, a colorant, a fragrance, and a deodorizing agent.

In a case of providing anti-blocking property under moisture absorption, for example, among the additive particles, inorganic powder is preferably used, and water-insoluble inorganic powder is particularly preferably used. Examples of the inorganic powder include calcium carbonate, kaolin, talc, mica, bentonite, clay, sericite, asbestos, glass fiber, carbon fiber, glass powder, glass balloon, shirasu balloon, coal powder, metal powder, ceramic powder such as alumina, silica, zeolite, activated carbon, and slate powder.

The water-absorbent resin particle hopper 12 accommodates the water-absorbent resin particles obtained in the resin particle preparation step s1.

The additive particle hopper 11 is connected to the first mixing apparatus 13 via an additive particle supply pipe 21. In addition, the water-absorbent resin particle hopper 12 is connected to the first mixing apparatus 13 via a water-absorbent resin particle supply pipe 22. The additive particles accommodated in the additive particle hopper 11 are supplied to the first mixing apparatus 13 via the additive particle supply pipe 21, and the water-absorbent resin particles accommodated in the water-absorbent resin particle hopper 12 are supplied to the first mixing apparatus 13 via the water-absorbent resin particle supply pipe 22.

<Primary Mixing Step>

The primary mixing step s21 corresponds to a primary mixing stage in which the water-absorbent resin particles and the additive particles are primarily mixed by using the first mixing apparatus 13, in the mixing step s2.

As the first mixing apparatus 13 used in the primary mixing step s21, it is possible to exemplify an airflow-type mixing machine or a rotation stirring-type mixing machine which is a continuous-type or batch-type mixing machine, and the rotation stirring-type mixing machine particularly preferably used. Examples of the first mixing apparatus 13 include continuous-type or batch-type mechanical mixing machines such as a conical blender, a Nauta mixer, a kneader, a V-shaped mixing machine, a fluidizing-type mixing machine, a turbulizer, a LOEDIGE mixer, a screw mixer, a ribbon blender, a silo blender, and a mortar mixer. In such a rotation stirring-type mixing machine, a stirring blade is typically rotated at 10 to 10000 rpm, or further, at 100 to 5000 rpm.

In the primary mixing step s21 performed by the first mixing apparatus 13, a temperature of the primary mixing processing is set, for example, to 10 to 100° C. In addition, the time of the primary mixing processing in the primary mixing step s21 is appropriately set in accordance with the processing amount, and for example, is set to 1 to 10 minutes/t (ton).

In addition, a mixing ratio between the water-absorbent resin particles and the additive particles, which are primarily mixed in the primary mixing step s21, is not particularly limited and is determined by appropriately considering a desired water absorption property and other properties of the water-absorbent resin composition to be manufactured and knowledge in the related art. As an example, the mixing ratio (mass ratio) between the water-absorbent resin particles and the additive particles is preferably from 100:0.01 to 100:1 (water-absorbent resin particles:additive particles), more preferably from 100:0.1 to 100:0.7 (water-absorbent resin particles:additive particles), and further preferably from 100:0.2 to 100:0.5 (water-absorbent resin particles:additive particles). When the mixing ratio of the additive particle is equal to or greater than 0.01, an anti-blocking property ratio under moisture absorption of the obtained water-absorbent resin composition is maintained to be a small value, and excellent absorbed moisture flowability is preferably achieved. In contrast, when the mixing ratio of the additive particles is equal to or less than 1, the obtained water-absorbent resin composition has an excellent absorption ratio under pressure (water absorption capacity under pressure), which is preferable. However, it is a matter of course that an embodiment is also applicable in which the mixing ratio thereof is outside the range.

It is preferable that the primary mixing step s21 further includes a plurality of mixing stages. When the primary mixing step s21 of primarily mixing the water-absorbent resin particles and the additive particles further includes a plurality of mixing stages, it is possible to obtain a primary mixture by dividing the entire amount of the water-absorbent resin particles and the additive particles which are necessary for manufacturing the water-absorbent resin composition, into a plurality of parts and mixing the plurality of parts in the respective mixing stages in the primary mixing step s21.

In the primary mixing step s21 including the plurality of mixing stages, the processing amount of the water-absorbent resin particles to be primarily mixed in one mixing stage is preferably greater than 0 kg and equal to or less than 40000 kg, more preferably greater than 0 kg and equal to or less than 20000 kg, and particularly preferably greater than 0 and equal to or less than 10000 kg. In doing so, it is possible to improve the dispersibility of the additive particles in the primary mixture that is obtained in the primary mixing step s21.

The primary mixture that is obtained by the first mixing apparatus 13 is supplied to a first transport pipe 24 via a primary mixture leading pipe 23 by a first opening-closing valve 23a being released. The first transport pipe 24 is disposed between the first mixing apparatus 13 and the second mixing apparatus 15.

<First Transport Mixing Step>

The first transport mixing step s22 corresponds to a first transport mixing stage in the mixing step s2 of vapor-phase transporting the primary mixture obtained in the primary mixing step s21 through the first transport pipe 24 while mixing the primary mixture in the first transport pipe 24.

Compressed air that is generated by the first compressor 14 connected to one end of the first transport pipe 24 flows through the first transport pipe 24, and the primary mixture that is supplied to the first transport pipe 24 via the primary mixture leading pipe 23 is transported toward the second mixing apparatus 15 by a flow of the compressed air caused by the first compressor 14 and is mixed during the transport. A vapor-phase transportation apparatus is configured of the first compressor 14 and the first transport pipe 24 as described above.

The vapor-phase transportation apparatus that is configured of the first compressor 14 and the first transport pipe 24 is not particularly limited, and examples thereof include apparatuses based on transportation schemes such as a plug flow dense phase transportation scheme, a layer flow dilute phase transportation scheme, a dune flow dense phase transportation scheme, and a suspension flow dilute phase transportation scheme.

The plug flow dense phase transportation scheme in the vapor-phase transportation apparatus is one of transportation schemes in which granular materials (primary mixture) are moved (transported) while forming groups like plugs without floating. A vapor-phase transportation apparatus based on such a plug flow dense phase transportation scheme consumes a small amount of air and exhibits excellent transportation efficiency, and breakage of the transported material (primary mixture), abrasion of the first transport pipe 24, and the like are unlikely to occur. In addition, the vapor-phase transportation apparatus based on the plug flow dense phase transportation scheme has a feature in which streamers hardly occur when resin pellets are transported.

The layer flow dilute phase transportation scheme in the vapor-phase transportation apparatus is a transportation scheme in which a wind velocity is relatively low in categories of floating flow and the granular materials (primary mixture) concentrate on the bottom of the first transport pipe 24. The vapor-phase transportation apparatus based on the layer flow dilute phase transportation scheme exhibits a higher mixing ratio and more excellent transportation efficiency, and breakage of the transported material (primary mixture), abrasion of the first transport pipe 24, and the like are unlikely to occur, as compared with a scheme using dispersed flow.

The dune flow dense phase transportation scheme in a vapor-phase transportation apparatus is a high-concentration transportation configuration in which the granular materials (primary mixture) are moved (transported) while sliding in the form of a grouped flow like sand dune at the bottom of the first transport pipe 24. Although the vapor-phase transportation apparatus based on the dune flow dense phase transportation scheme has substantially the same formation principle as that of the plug flow dense phase transportation scheme in a case of rough powder, the vapor-phase transportation apparatus based on the dune flow dense phase transportation scheme has a feature in which particle groups have no part or only a small part blocking a pipe section of the first transport pipe 24 unlike a plug flow.

The suspension flow dilute phase transportation scheme in a vapor-phase transportation apparatus is a transportation configuration in which the granular materials (primary mixture) are moved (transported) while flying. According to the vapor-phase transportation apparatus based on the suspension flow dilute phase transportation scheme, a wind velocity in the first transport pipe 24 is high, and the scheme belongs to so-called low-concentration transport.

Processing conditions of the transport mixing processing in the first transport mixing step s22 which is performed by the vapor-phase transportation apparatus configured of the first compressor 14 and the first transport pipe 24, are appropriately set in accordance with the processing amount, the transportation distance, and the like of the primary mixture as a target of the vapor-phase transportation. Specifically, air pressure during vapor-phase transportation (pressure of compressed air that is generated by the first compressor 14) is preferably set to 0.01 to 10 MPa, and is more preferably set to 0.01 to 1 MPa.

The entire length of the first transport pipe 24 is preferably set to 1 to 2000 m, and is more preferably set to 10 to 300 m. In addition, the inner diameter of the first transport pipe 24 is preferably set to 10 to 400 mm, and is more preferably set to 30 to 300 mm.

The processing amount in the transport mixing processing in the first transport mixing step s22 is preferably set to 1000 to 30000 kg/hour, and is more preferably set to 1000 to 20000 kg/hour. In addition, the processing time of the transport mixing processing in the first transport mixing step s22 is preferably set to 0.01 to 30 minutes, and is more preferably set to 0.1 to 10 minutes. Moreover, the processing temperature of the transport mixing processing in the first transport mixing step s22 is preferably set to 10 to 100° C., and is more preferably set to 20 to 90° C.

The transportation wind velocity at an end on an outlet side (on the side of the second mixing apparatus 15) of the first transport pipe 24 (the terminal transportation wind velocity) is preferably set to 0.1 to 30 m/sec, and is more preferably set to 1 to 15 m/sec. In addition, a solid-gas ratio at the end on the outlet side (on the side of the second mixing apparatus 15) of the first transport pipe 24 (terminal solid-gas ratio) is preferably set to 1 to 200 kg-Solid/kg-Air, and is more preferably set to 5 to 100 kg-Solid/kg-Air.

Although the above description was made of the method of vapor-phase transporting the primary mixture obtained by the first mixing apparatus 13 toward the second mixing apparatus 15 by the vapor-phase transportation apparatus configured of the first compressor 14 and the first transport pipe 24, a method of transporting the primary mixture to the second mixing apparatus 15 is not limited to the vapor-phase transportation method. As an apparatus that achieves another method of transporting the primary mixture to the second mixing apparatus 15, transportation apparatuses such as a screw conveyer, a spring conveyer, a belt conveyer, a bucket conveyer, and a vibration feeder are exemplified, and a transportation apparatus that transports the primary mixture in a non-opened state is preferably used. A transportation apparatus which is a non-opened system and in which a vapor-phase portion, namely a portion for receiving the primary mixture, in the conveyer is partitioned by a partitioning plate or a screw, for example, is more preferably used.

A non-opened system can be easily achieved from any of the vapor-phase transportation apparatus configured of the first compressor 14 and the first transport pipe 24 and the aforementioned transportation apparatus without impairing a continuous transport property, by attaching rotary valves, for example, to the discharge ports thereof and, if necessary, to the inlet ports thereof. The apparatus from which a non-opened system can be easily achieved is a vapor-phase transportation apparatus or a screw conveyer, and particularly, a vapor-phase transportation apparatus. In addition, the vapor-phase transportation apparatus has a particularly excellent effect of promoting mixing of the primary mixture.

The primary mixture obtained by the first mixing apparatus 13 is vapor-phase transported through the first transport pipe 24 and is supplied to the second mixing apparatus 15 while being mixed in the first transport pipe 24.

<Secondary Mixing Step>

The secondary mixing step s23 corresponds to the secondary mixing stage in the mixing step s2, in which the primary mixture mixed in the first transport pipe 24 is secondarily mixed by using the second mixing apparatus 15 until the additive particles are uniformly dispersed in the primary mixture.

As the second mixing apparatus 15 used in the secondary mixing step s23, it is possible to exemplify an airflow-type mixing machine or rotation stirring-type mixing machine which is a continuous-type or batch-type mixing machine, in the same manner as the aforementioned first mixing apparatus 13, and it is preferable to use a rotation stirring-type mixing machine, in particular. Examples of the second mixing apparatus 15 include continuous-type or batch-type mechanical mixers such as a conical blender, a Nauta mixer, a kneader, a V-shaped mixing machine, a fluidizing-type mixing machine, a turbulizer, a LOEDIGE mixer, a screw mixer, a ribbon blender, a silo blender, and a mortar mixer. In such a rotation stirring-type mixing machine, a stirring blade is typically rotated at 10 to 10000 rpm, or further, at 100 to 5000 rpm.

The second mixing apparatus 15 used in the secondary mixing step s23 is preferably an apparatus based on a mixing scheme that is different from that of the aforementioned first mixing apparatus 13. When the first mixing apparatus 13 used in the primary mixing step s21 for obtaining the first mixture by primarily mixing the water-absorbent resin particles and the additive particles and the second mixing apparatus 15 used in the secondary mixing step s23 for obtaining the secondary mixture by secondarily mixing the primary mixture are based on different mixing schemes from each other as described above, it is possible to obtain a water-absorbent resin composition in which the additive particles are further uniformly dispersed, in a short period of time.

In the secondary mixing step s23 performed by the second mixing apparatus 15, the processing temperature of the secondary mixing processing is set, for example, to 10 to 100° C. In addition, although the processing time of the secondary mixing processing in the secondary mixing step s23 is arbitrarily set in accordance with the processing amount, the processing time is set to 1 to 10 minutes/t (ton), for example.

The secondary mixture obtained by the second mixing apparatus 15 is supplied to the second transport pipe 26 via a secondary mixture leading pipe 25 by a second opening-closing valve 25a being opened. The second transport pipe 26 is disposed between the second mixing apparatus 15 and the water-absorbent resin composition hopper 17. In addition, a changeover valve 26a is provided in the second transport pipe 26, and a circulating pipe 27 is provided so as to be branched from a portion of the second transport pipe 26 at which the changeover valve 26a is provided. The circulating pipe 27 is disposed between the changeover valve 26a and the second mixing apparatus 15. The secondary mixture supplied from the second mixing apparatus 15 to the second transport pipe 26 is returned to the second mixing apparatus 15 when the changeover valve 26a is switched to the side of the second mixing apparatus 15, and vapor-phase transportation toward the water-absorbent resin composition hopper 17 is performed when the changeover valve 26a is switched to the side of the water-absorbent resin composition hopper 17.

<Second Transport Mixing Step>

The second transport mixing step s24 corresponds to the second transport mixing stage in the mixing step s2 by vapor-phase transporting the secondary mixture obtained in the secondary mixing step s23 through the second transport pipe 26 while mixing the secondary mixture in the second transport pipe 26.

Compressed air that is generated by the second compressor 16 connected to one end of the second transport pipe 26 flows through the second transport pipe 26, and the secondary mixture supplied to the second transport pipe 26 via the secondary mixture leading pipe 25 is discharged and transported toward the water-absorbent resin composition hopper 17 by the flow of the compressed air caused by the second compressor 16 and is then mixed during the transportation. The vapor-phase transportation apparatus is configured of the second compressor 16 and the second transport pipe 26 as described above.

The vapor-phase transportation apparatus configured of the second compressor 16 and the second transport pipe 26 is configured in the same manner as the aforementioned vapor-phase transportation apparatus that is configured of the first compressor 14 and the first transport pipe 24, and the secondary mixture supplied to the second transport pipe 26 is transported while blocking the second transport pipe 26 in a plug shape.

Processing conditions of the transport mixing processing in the second transport mixing step s24 which is performed by the vapor-phase transportation apparatus configured of the second compressor 16 and the second transport pipe 26, are appropriately set in accordance with the processing amount, the transportation distance, and the like of the secondary mixture as a target of the vapor-phase transportation. Specifically, air pressure during vapor-phase transportation (pressure of compressed air that is generated by the second compressor 16) is preferably set to 0.01 to 10 MPa, and is more preferably set to 0.01 to 1 MPa.

The entire length of the second transport pipe 26 is preferably set to 1 to 2000 m, and is more preferably set to 10 to 300 m. In addition, the inner diameter of the second transport pipe 26 is preferably set to 10 to 400 mm, and is more preferably set to 30 to 300 mm.

The processing amount in the transport mixing processing in the second transport mixing step s24 is preferably set to 1000 to 30000 kg/hour, and is more preferably set to 1000 to 20000 kg/hour. In addition, the processing time of the transport mixing processing in the second transport mixing step s24 is preferably set to 0.01 to 30 minutes, and is more preferably set to 0.1 to 10 minutes. Moreover, the processing temperature of the transport mixing processing in the second transport mixing step s24 is preferably set to 10 to 100° C., and is more preferably set to 20 to 90° C.

The transportation wind velocity at an end on an outlet side (on the side of the water-absorbent resin composition hopper 17) of the second transport pipe 26 (the terminal transportation wind velocity) is preferably set to 0.1 to 30 m/sec, and is more preferably set to 1 to 15 m/sec. In addition, a solid-gas ratio at the end on the outlet side (on the side of the water-absorbent resin composition hopper 17) of the second transport pipe 26 (terminal solid-gas ratio) is preferably set to 1 to 200 kg-Solid/kg-Air, and is more preferably set to 5 to 100 kg-Solid/kg-Air.

The secondary mixture obtained by the second mixing apparatus 15 is vapor-phase transported through the second transport pipe 26 and is supplied to the water-absorbent resin composition hopper 17 while being mixed in the second transport pipe 26.

The water-absorbent resin composition obtained in the mixing step s2 including the primary mixing step s21, the first transport mixing step s22, the secondary mixing step s23, and the second transport mixing step s24 as described above is subjected to the collecting step s3.

[Collecting Step]

The collecting step s3 is a step of collecting the water-absorbent resin composition which is obtained in the mixing step s2, in the water-absorbent resin composition hopper 17 that functions as a collecting tank.

The water-absorbent resin composition after being vapor-phase transported through the second transport pipe 26 in the aforementioned second transport mixing step s24 flows into the water-absorbent resin composition hopper 17. The water-absorbent resin composition flowing into the water-absorbent resin composition hopper 17 as described above is accommodated in the water-absorbent resin composition hopper 17.

In the method of manufacturing the water-absorbent resin composition according to the embodiment, a mixing procedure for obtaining the water-absorbent resin composition in which the additive particles are blended at predetermined concentration with respect to the water-absorbent resin particles, may be any one of the following four mixing procedures (a) to (d).

(a) The water-absorbent resin particles and the additive particles are raw materials of the water-absorbent resin composition, and a necessary amount of the water-absorbent resin particles for obtaining a targeted production amount of the water-absorbent resin composition and a necessary amount of the additive particles for obtaining the targeted production amount of the water-absorbent resin composition are primarily mixed in the primary mixing step s21. Then, the total amount of the primary mixture obtained in the primary mixing step s21 (the total amount of the primary mixture obtained in the respective mixing stages when the primary mixing step s21 includes a plurality of mixing stages) is secondarily mixed in the secondary mixing step s23.

(b) A smaller amount of the water-absorbent resin particles as compared with the necessary amount of the water-absorbent resin particles for obtaining the targeted production amount of the water-absorbent resin composition, and the necessary amount of the additive particles for obtaining the targeted production amount of the water-absorbent resin composition are primarily mixed in the primary mixing step s21. Then, the rest of the water-absorbent resin particles is added to the total amount of the primary mixture obtained in the primary mixing step s21 and is then secondarily mixed in the secondary mixing step s23.

(c) A smaller amount of the additive particles as compared with the necessary amount of the additive particles for obtaining the targeted production amount of the water-absorbent resin composition, and the necessary amount of the water-absorbent resin particles for obtaining the targeted production amount of the water-absorbent resin composition are primarily mixed in the primary mixing step s21. Then, the rest of the additive particles is added to the total amount of the primary mixture obtained in the primary mixing step s21 and is then secondarily mixed in the secondary mixing step s23.

(d) A smaller amount of the water-absorbent resin particles as compared with the necessary amount of the water-absorbent resin particles for obtaining the targeted production amount of the water-absorbent resin composition and a smaller amount of additive particles as compared with the necessary amount of the additive particles for obtaining the targeted production amount of the water-absorbent resin composition are primarily mixed in the primary mixing step s21. Then, the rest of the water-absorbent resin particles and the rest of the additive particles are added to the total amount of the primary mixture obtained in the primary mixing step s21 and are then secondarily mixed in the secondary mixing step s23.

Since the water-absorbent resin particles and the additive particles are mixed in the multiple stages by using the plurality of mixing apparatuses (the first mixing apparatus 13 and the second mixing apparatus 15) in the method of manufacturing a water-absorbent resin composition according to the embodiment, it is possible to obtain a water-absorbent resin composition in which the additive particles are uniformly dispersed, in a short period of time without damaging the surfaces of the water-absorbent resin particles. Accordingly, it is possible to obtain a water-absorbent resin composition which causes the additive particles to sufficiently exhibit additional functions such as anti-blocking property under moisture absorption while maintaining an excellent water absorption property.

In addition, it is difficult to obtain a water-absorbent resin composition in which the additive particles are uniformly dispersed, in a case of producing a large amount of water-absorbent resin composition and mixing the water-absorbent resin particles and the additive particles in large-scaled production equipment. Since the water-absorbent resin particles and the additive particles are mixed in the multiple stages by using the plurality of mixing apparatuses in the method of manufacturing a water-absorbent resin composition according to the embodiment, it is possible to obtain a water-absorbent resin composition in which the additive particles are uniformly dispersed, in a short period of time even in the case of mixing the water-absorbent resin particles and the additive particles in the large-scaled production equipment.

EXAMPLES

Hereinafter, although a specific description of the invention will be given below with reference to examples of the invention, the invention is not limited to the following examples.

[Preparation of Water-Absorbent Resin Particles]

First, water-absorbent resin was manufactured by causing two-stage polymerization reactions of a water-soluble ethylenically-unsaturated monomer in a petroleum-based hydrocarbon dispersion medium based on the reverse-phase suspension polymerization method by using a radical polymerization initiator in the presence of a surfactant.

Specifically, 10% by mass of n-heptane solution containing n-heptane, which was maintained at a temperature of 25° C., as the petroleum-based hydrocarbon dispersion medium and polyglycerin-fatty acid ester (product name: Sunsoft Q-185S manufactured by Taiyo Kagaku Co., Ltd.) as the surfactant was prepared in a polymerization reaction vessel for the first polymerization.

Then, the content inside the polymerization reaction vessel was heated up to 90° while being stirred by a stirring unit to dissolve the surfactant. Then, the content in the polymerization reaction vessel was cooled to 50° C.

Further, 80% by mass of aqueous acrylic acid solution as the water-soluble ethylenically-unsaturated monomer was added to another vessel, and 30% by mass of aqueous sodium hydroxide solution as an alkaline neutralizer was dropped while cooling the aqueous acrylic acid solution to neutralize the aqueous acrylic acid solution such that a degree of neutralization became 75 mol % of an acid group of the water-soluble ethylenically-unsaturated monomer. Then, potassium persulfate as a radical polymerization initiator, N,N'-methylenebisacrylamide as a crosslinking agent, and water were added thereto and dissolved therein, and a monomer for the first polymerization was prepared as an aqueous solution.

The entire amount of the aqueous solution of the monomer for the first polymerization which was prepared in the another vessel as described above and was maintained at a temperature of 10° C., was added to the polymerization reaction vessel, the content in the polymerization reaction vessel was maintained at 30°, and the inside of the system was sufficiently substituted with nitrogen.

Then, the content in the polymerization reaction vessel was heated up to 55° C. while stirred by the stirring unit to start the polymerization. After the start of the polymerization, polymerization was performed at 80° C. for 30 minutes from timing at which a temperature of the content in the polymerization reaction vessel reached 80° C. after the temperature of the content increased due to polymerization heat, the content in the polymerization reaction vessel was then cooled to 13° C., and a mixture after the first reaction was obtained.

Furthermore, an aqueous solution of a monomer for the second polymerization was prepared in another vessel. Specifically, 80% by mass of aqueous acrylic acid solution as the water-soluble ethylenically-unsaturated monomer was added to the another vessel, and 30% by mass of aqueous sodium hydroxide solution as the alkaline neutralizer was dropped while cooling the aqueous acrylic acid solution to neutralize the aqueous acrylic acid solution such that a degree of neutralization became 75 mol % of an acid group of the water-soluble ethylenically-unsaturated monomer. Then, potassium persulfate as the radical polymerization initiator, N,N'-methylenebisacrylamide as the crosslinking agent, and water were added thereto and dissolved therein to prepare an aqueous solution of the monomer for the second polymerization.

The total amount of the aqueous solution of the monomer for the second polymerization which was prepared in the another vessel as described above and was maintained at a temperature of 13° C., was poured into the polymerization reaction vessel that accommodated the aforementioned mixture obtained in the first reaction, and the inside of the system was sufficiently substituted with nitrogen.

Then, the content in the polymerization reaction vessel was heated up to 55° C. while stirred by the stirring unit to start polymerization. After the start of the polymerization, the polymerization was performed at 80° C. for 30 minutes from timing at which the temperature of the content in the polymerization reaction vessel reached 80° C. after the temperature of the content increases due to polymerization heat, and a mixture after the second reaction was obtained.

The mixture after the second reaction was moved to a concentrator, the content in the concentrator was heated up to 90° C. while stirred by the stirring unit, n-heptane and water were separated by azeotropic distillation of n-heptane and water, n-heptane was returned to the concentrator, and water was removed to the outside of the system. Then, N,N'-methylenebisacrylamide as the crosslinking agent was added thereto, the content in the concentrator was reacted at 90° C., and a surface-crosslinked mixture after the reaction was obtained.

The surface-crosslinked mixture after the reaction was moved to a dryer, water and n-heptane were removed to the outside of the system by further heating the surface-crosslinked mixture, the dried water-absorbent resin was sieved with a sieve with openings of 850 μm, and water-absorbent resin particles (A1) was obtained.

[Manufacturing of Water-Absorbent Resin Composition]

Example 1

Primary Mixing Step

The thus obtained water-absorbent resin particles (A1) and amorphous silica (Sipernat 200 manufactured by Degussa Japan Co., Ltd., primary particle diameter: several nm to several tens of nm) as the additive particles were primarily mixed by using a screw-type vertical axis rotation-type mixing machine (Nauta mixer) (Nauta mixer NX-150 manufactured by Hosokawa Micron Corporation) to obtain a primary mixture. Processing conditions of the mixing processing in the primary mixing step using the Nauta mixer were set as follows:

Processing amount: 0.5 part by mass (50 kg) of amorphous silica was added with respect to 100 parts by mass (10000 kg) of water-absorbent resin particles (A1).
Processing time: 1.5 minutes/t (total of 15 minutes)
Processing temperature: 20° C.

<First Transport Mixing Step>
The thus obtained primary mixture was mixed in the first transport pipe by being vapor-phase transported through the first transport pipe. Processing conditions of the transport mixing processing in the first transport mixing step were set as follows:
Pressure during vapor-phase transportation (air pressure): 0.08 MPa
Entire length and inner diameter of first transport pipe: entire length of 50 m, inner diameter of 150 mm
Processing amount: 10000 kg/hour
Processing time: 0.3 minute
Processing temperature: 20° C.
Terminal transportation wind velocity in first transport pipe: 3 m/sec
Terminal solid-gas ratio in first transport pipe: 60 kg-Solid/kg-Air <Secondary Mixing Step>
The primary mixture after the transport mixing processing in the first transport mixing step was secondarily mixed by using a recycling gravity-type silo blender (SUS silo blender manufactured by Nippon Aluminium Corporation), and a secondary mixture was obtained. Processing conditions of the mixing processing in the secondary mixing step using the silo blender were set as follows:
Processing amount: the total amount (60000 kg) of the primary mixtures obtained in the primary mixing step performed six times
Processing time: 6.0 minutes/t (total of 6 hours)
Processing temperature: 20° C.

<Second Transport Mixing Step>
The thus obtained secondary mixture was mixed in the second transport pipe by being transported in a vapor phase through the second transport pipe, and a water-absorbent resin composition in Example 1 was obtained. Processing conditions of the transport mixing processing in the second transport mixing step were set as follows:
Pressure during vapor-phase transportation (air pressure): 0.2 MPa
Entire length and inner diameter of second transport pipe: entire length of 200 m, inner diameter of 200 mm
Processing amount: 20000 kg/hour
Processing time: 0.6 minute
Processing temperature: 20° C.
Terminal transportation wind velocity in second transport pipe: 6 m/sec
Terminal solid-gas ratio in second transport pipe: 30 kg-Solid/kg-Air Example 2

A water-absorbent resin composition in Example 2 was obtained in the same manner as in Example 1 other than that the secondary mixing step was performed as follows.
<Secondary Mixing Step>
The primary mixture after the transport mixing processing in the first transport mixing step was secondarily mixed by using a screw-shaped vertical axis rotation-type mixing machine (Nauta mixer) (Nauta mixer NX-250 manufactured by Hosokawa Micron Corporation), and a secondary mixture was obtained. Processing conditions of the mixing processing in the secondary mixing step using the Nauta mixer were set as follows:
Processing amount: the total amount (20000 kg) of the primary mixtures obtained in the primary mixing step performed twice
Processing time: 6.0 minutes/t (total of 2 hours)
Processing temperature: 20° C.

Example 3

A water-absorbent resin composition in Example 3 was obtained in the same manner as in Example 1 other than that the addition amount of amorphous silica (Sipernat 200 manufactured by Degussa Japan Co., Ltd.) with respect to 100 parts by mass (10000 kg) of water-absorbent resin particles (A1) was changed from 0.5 part by mass to 0.1 parts by mass in the primary mixing step.

Comparative Example 1

The secondary mixing step and the second transport mixing step were not performed. Specifically, the water-absorbent resin particles (A1) and the amorphous silica (Sipernat 200 manufactured by Degussa Japan Co., Ltd.) as the additive particles were mixed by using a screw-shaped vertical axis rotation-type mixing machine (Nauta mixer) (Nauta mixer NX-150 manufactured by Hosokawa Micron Corporation) first, and a mixture was obtained. Processing conditions of the mixing processing using the Nauta mixer were set as follows:

Processing amount: 0.5 part by mass (50 kg) of amorphous silica was added to 100 parts by mass (10000 kg) of water-absorbent resin particles (A1).

Processing time: 7.5 minutes/t (total of 75 minutes)

Processing temperature: 20° C.

Next, the thus obtained mixture was mixed in a transport pipe by being vapor-phase transported through the transport pipe, and a water-absorbent resin composition in Comparative Example 1 was obtained. Processing conditions of the transport mixing processing were set as follows:

Pressure during vapor-phase transportation (air pressure): 0.08 MPa

Entire length and inner diameter of transport pipe: entire length of 50 m, inner diameter of 150 mm Processing amount: 10000 kg/hour Processing time: 0.3 minute Processing temperature: 20° C.

Terminal transportation wind velocity in transport pipe: 3 m/sec

Terminal solid-gas ratio in transport pipe: 60 kg-Solid/kg-Air

Comparative Example 2

A water-absorbent resin composition in Comparative Example 2 was obtained in the same manner as in Comparative Example 1 other than that the addition amount of amorphous silica (Sipernat 200 manufactured by Degussa Japan Co., Ltd.) with respect to 100 parts by mass (10000 kg) of water-absorbent resin particles (A1) was changed from 0.5 part by mass to 0.1 parts by mass.

[Evaluation Results]

Anti-blocking ratio under moisture absorption, water absorption capacity, and water absorption capacity under pressure of the thus obtained water-absorbent resin compositions in Examples 1 to 3 and Comparative Examples 1 and 2 were evaluated.

<Anti-Blocking Ratio Under Moisture Absorption>

In a cylindrical aluminum dish with a diameter of 5 cm, 10 g of each water-absorbent resin composition that passed through 20-mesh sieve was uniformly prepared and was left to stand for 3 hours in a bench-type thermohygrostat set at a temperature of 40±1° C. and at a relative moisture of 80±5%. The total weight a (g) of each water-absorbent resin composition after standing for 3 hours was measured, the water-absorbent resin composition was sieved by a 12-mesh metal sieve by being tapped five times, a weight b (g) of resin particles of equal to or greater than the 12-mesh size obtained by being blocked by moisture absorption was measured, and an anti-blocking ratio under moisture absorption was obtained by the following formula (1).

$$\text{Anti-blocking Ratio under Moisture Absorption (\%)} = (b/a) \times 100 \quad (1)$$

<Water Absorption Capacity>

A 500 mL beaker was charged with 500 g of 0.9% by mass saline, and thereto was added 2.0 g of the water-absorbent resin composition, and the mixture was stirred for 60 minutes. A mass Wa (g) of a JIS standard sieve having an opening of 75 μm was previously determined, and the content in the above beaker was filtered using this sieve. Then, the sieve was allowed to stand for 30 minutes in a state so that the sieve was tilted at a tilt angle of about 30 degrees to the horizontal to filter out excess water. Then, a mass Wb (g) of the sieve containing the water-absorbing gel was determined, and the water absorption capacity was obtained by the following formula (2).

$$\text{Water Absorption Capacity (g/g)} = (Wb - Wa)/2.0 \quad (2)$$

<Water Absorption Capacity Under Pressure>

Figure 5:
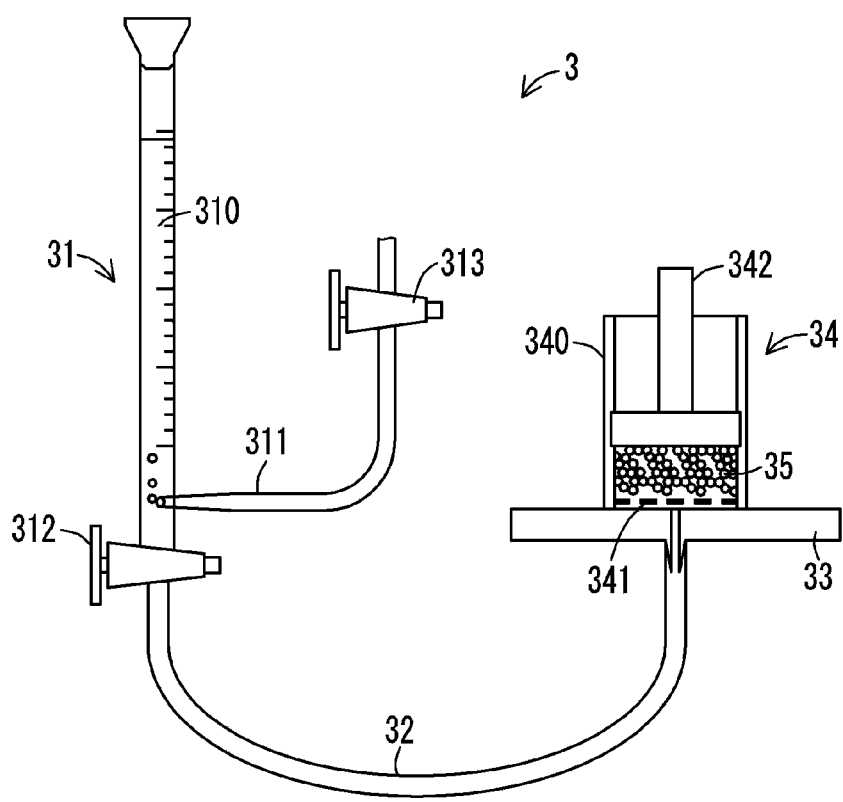
FIG. 5 is a diagram illustrating a configuration of a measuring apparatus 3 that is used for evaluating water absorption capacity under pressure.

The water absorption capacity of each water-absorbent resin composition under pressure was determined using a measuring apparatus 3 shown in FIG. 5. The measuring apparatus 3 illustrated in FIG. 5 comprises a buret section 31, a lead tube 32, a measuring board 33, and a measuring section 34 placed on the measuring board 33. To the buret section 31 are connected a rubber plug on the top of a buret 310, and an air introduction tube 311 and a cock 312 at the bottom portion of the buret 310, and further, the air introduction tube 311 has a cock 313 at the end. The lead tube 32 is attached between the buret section 31 and the measuring board 33. The lead tube 32 has an inner diameter of 6 mm. A hole of a diameter of 2 mm is made at the central section of the measuring board 33, and the lead tube 32 is connected thereto. The measuring section 34 has a cylindrical portion 340 (made of Plexiglas), a nylon mesh 341 adhered to the bottom part of the cylindrical portion 340, and a weight 342. The cylindrical portion 340 has an inner diameter of 20 mm. The nylon mesh 341 has an opening of 75 μm (200 mesh), each water-absorbent resin composition 35 was evenly spread over the nylon mesh 341 upon the determination. The weight 342 has a diameter of 19 mm and a mass of 59.8 g. The weight 342 was placed on the water-absorbent resin composition 35 so that a 2.07 kPa load could be applied to the water-absorbent resin composition 35.

Next, the determination procedure will be described. The determination was carried out in a room at 25° C. First, the cock 312 and the cock 313 at the buret section 31 were closed, 0.9% by mass saline adjusted to 25° C. was poured from the top of the buret 310 and the top of the buret 310 was plugged with the rubber plug. Thereafter, the cock 312 and the cock 313 at the buret section 31 were opened. Next, the height of the measuring board 33 was adjusted so that the level of the 0.9% by mass saline flew out from a lead tube port in the central section of the measuring board 33 and the upper surface of the measuring board 33 were at the same height.

Separately, 0.10 g of the water-absorbent resin composition 35 was evenly spread over the nylon mesh 341 in the cylindrical portion 340, and the weight 342 was placed on the water-absorbent resin composition 35, to prepare the measuring section 34. Subsequently, the measuring section 34 was placed so that its central section is in alignment with a lead tube port in the central section of the measuring board 33.

The volume reduction of 0.9% by mass saline i.e., the volume of 0.9% by mass saline absorbed by the water-absorbent resin composition 35, Wc (ml) is read off from a time point where the water-absorbent resin composition 35 started absorbing water. The water absorption capacity of the water-absorbent resin composition 35 under pressure after 60 minutes passed from the beginning of the water absorption was obtained by the following formula (3).

$$\text{Water Absorption Capacity under Pressure (ml/g)} = Wc/0.10 \quad (3)$$

Evaluation results will be shown in Table 1.

TABLE 1

| | Mixing step | | | | Evaluation results | | |
|---|---|---|---|---|---|---|---|
| | Primary mixing step | | | | | | |
| | Addition amount of additive particles (Part by mass) | Mixing machine | Processing time (minutes/t) | Secondary mixing step | | | Water absorption capacity under pressure (ml/g) |
| | | | | Mixing machine | Processing time (minutes/t) | Anti-blocking ratio under moisture absorption (%) | Water absorption capacity (g/g) |
| Example 1 | 0.5 | Nauta mixer | 1.5 | Silo blender | 6 | 6 | 61 | 34 |
| Example 2 | 0.5 | Nauta mixer | 1.5 | Nauta mixer | 6 | 13 | 64 | 35 |
| Example 3 | 0.1 | Nauta mixer | 1.5 | Silo blender | 6 | 10 | 59 | 33 |
| Comparative Example 1 | 0.5 | Nauta mixer | 7.5 | — | | 30 | 62 | 34 |
| Comparative Example 2 | 0.1 | Nauta mixer | 7.5 | — | | 34 | 61 | 32 |

As is obvious from Table 1, the water-absorbent resin compositions in Examples 1 to 3 that were obtained by further secondarily mixing the primary mixtures which were obtained in the primary mixing step, in the secondary mixing step sufficiently exhibited anti-blocking property under moisture absorption as an additional function of the additive particles (amorphous silica) while maintaining the water absorption properties indicated by the water absorption capacity and the water absorption capacity under pressure in excellent states and maintaining the anti-blocking property under moisture absorption to be low as compared with the water-absorbent resin compositions in Comparative Examples 1 and 2.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description. Further, all changes or modifications which come within the meaning and the range of equivalency of the claims are therefore intended to be embraced therein.

REFERENCE SIGNS LIST

1: Mixing equipment
11: Additive particle hopper
12: Water-absorbent resin particle hopper
13: First mixing apparatus
14: First compressor
15: Second mixing apparatus
16: Second compressor
17: Water-absorbent resin composition hopper

The invention claimed is:

1. A method of manufacturing a water-absorbent resin composition containing water-absorbent resin particles and additive particles, the method comprising:
   a resin particle preparation step of preparing the water-absorbent resin particles; and
   a mixing step of mixing the water-absorbent resin particles which are prepared in the resin particle preparation step, with additive particles in multiple stages by using a plurality of mixing apparatuses and obtaining a water-absorbent resin composition,
   wherein the mixing step includes:
      a primary mixing stage of carrying out primary mixing of the water-absorbent resin particles with the additive particles by using a first mixing apparatus;
      a first transport mixing stage of vapor-phase transporting the primary mixture, which is obtained in the primary mixing stage, from the first mixing apparatus to a second mixing apparatus through a first transport pipe disposed between the first mixing apparatus and the second mixing apparatus, while mixing the primary mixture in the first transport pipe;
      a secondary mixing stage of carrying out secondary mixing of a mixture which is obtained in the first transport mixing stage, by using the second mixing apparatus until the additive particles are uniformly dispersed; and
      a second transport mixing stage of vapor-phase transporting a secondary mixture, which is obtained in the secondary mixing stage, from the second mixing apparatus through a second transport pipe which discharges the secondary mixture from the second mixing apparatus, while mixing the secondary mixture in the second transport pipe.

2. The method of manufacturing a water-absorbent resin composition according to claim 1,
   wherein the primary mixing stage includes a plurality of mixing stages.

3. The method of manufacturing a water-absorbent resin composition according to claim 1,
   wherein the first mixing apparatus and the second mixing apparatus are based on different mixing schemes from each other.

4. The method of manufacturing a water-absorbent resin composition according to claim 1,
   wherein the additive particles are formed of an inorganic substance.

5. The method of manufacturing a water-absorbent resin composition according to claim 2,
   wherein in the primary mixing stage, a processing amount of the water-absorbent resin particles in one primary mixing processing is greater than 0 kg and equal to or less than 40000 kg.

* * * * *